(12) United States Patent  (10) Patent No.: US 12,548,711 B2
Masuda et al.  (45) Date of Patent: Feb. 10, 2026

(54) ELECTRONIC DEVICE

(71) Applicant: TDK CORPORATION, Tokyo (JP)

(72) Inventors: Akihiro Masuda, Tokyo (JP); Shinya Ito, Tokyo (JP); Norihisa Ando, Tokyo (JP); Hideki Kaneko, Tokyo (JP); Ken Aburakawa, Tokyo (JP); Kenya Tamaki, Tokyo (JP); Akitoshi Yoshii, Tokyo (JP)

(73) Assignee: TDK CORPORATION, Tokyo (JP)

( * ) Notice: Subject to any disclaimer, the term of this patent is extended or adjusted under 35 U.S.C. 154(b) by 119 days.

(21) Appl. No.: 17/888,139

(22) Filed: Aug. 15, 2022

(65) Prior Publication Data

US 2023/0061638 A1 Mar. 2, 2023

(30) Foreign Application Priority Data

Aug. 27, 2021 (JP) ................. 2021-139281

(51) Int. Cl.
H01G 4/12 (2006.01)
H01G 4/012 (2006.01)
H01G 4/224 (2006.01)
H01G 4/236 (2006.01)

(52) U.S. Cl.
CPC ............... H01G 4/12 (2013.01); H01G 4/012 (2013.01); H01G 4/224 (2013.01); H01G 4/236 (2013.01)

(58) Field of Classification Search
CPC .......... H01G 4/12; H01G 4/012; H01G 4/224; H01G 4/236
See application file for complete search history.

(56) References Cited

U.S. PATENT DOCUMENTS

| | | | | |
|---|---|---|---|---|
| 2011/0102966 A1* | 5/2011 | Takeoka | ................... | H01G 2/08 361/301.3 |
| 2012/0003566 A1* | 1/2012 | Na | ...................... | H01M 8/0444 429/515 |
| 2015/0348710 A1* | 12/2015 | Sato | .......................... | H01G 2/04 29/25.42 |
| 2018/0182553 A1* | 6/2018 | Yazawa | ................... | H01G 4/224 |
| 2020/0098521 A1* | 3/2020 | Ito | ............................ | H01G 4/38 |
| 2020/0294719 A1* | 9/2020 | Masuda | ................. | H01G 4/224 |
| 2021/0043382 A1* | 2/2021 | Masuda | ................... | H01G 2/10 |

FOREIGN PATENT DOCUMENTS

| | | |
|---|---|---|
| JP | H06-196348 A | 7/1994 |
| JP | H08-273781 A | 10/1996 |

* cited by examiner

Primary Examiner — Michael P McFadden
(74) Attorney, Agent, or Firm — Oliff PLC

(57) ABSTRACT

An electronic device includes a case, a ceramic element, a first metal terminal, and a second metal terminal. The case includes a recess and its opening edge. The ceramic element is disposed in the recess and includes a first main surface and a second main surface opposing to each other, a first electrode portion formed on the first main surface, and a second electrode portion formed on the second main surface. The first metal terminal includes a first mounting portion disposed on the opening edge and being substantially perpendicular to the first and second main surfaces and a first electrode connection portion connected to the first electrode portion. The second metal terminal includes a second mounting portion disposed on the opening edge and being substantially perpendicular to the first and second main surfaces and a second electrode connection portion connected to the second electrode portion.

23 Claims, 12 Drawing Sheets

FIG. 8

ELECTRONIC DEVICE

BACKGROUND OF THE INVENTION

The present invention relates to an electronic device used as a capacitor or the like.

A capacitor or the like configured by connecting a metal terminal to a dielectric disk having a single plate shape has conventionally been proposed. Moreover, an electronic device has also been proposed in which the periphery of the dielectric disk is molded with an exterior material to be suitable for surface mounting.

However, conventional electronic devices for surface mounting require a molding step with an exterior material after fixing a dielectric disk and a metal terminal in a cavity for resin molding and thus have a problem with complexity for assembly process. Moreover, since it is necessary to change the molding die as the size of the dielectric disk changes, there is a problem that it is difficult to flexibly respond to the change in the size of the dielectric disk.

Patent Document 1: JPH06196348 (A)

BRIEF SUMMARY OF THE INVENTION

The present invention has been achieved under such circumstances and provides an electronic device being capable of flexibly responding to the change in the size of an internal ceramic element and having a good productivity.

To achieve the above object, an electronic device according to the present invention comprises:
  a case including a recess and an opening edge of the recess;
  a ceramic element disposed in the recess and including:
    a first main surface and a second main surface opposing to each other;
    a first electrode portion formed on the first main surface; and
    a second electrode portion formed on the second main surface;
  a first metal terminal including:
    a first mounting portion disposed on the opening edge and being substantially perpendicular to the first main surface and the second main surface; and
    a first electrode connection portion connected to the first electrode portion; and
  a second metal terminal including:
    a second mounting portion disposed on the opening edge and being substantially perpendicular to the first main surface and the second main surface; and
    a second electrode connection portion connected to the second electrode portion.

Since the ceramic element is accommodated in the recess of the case, the electronic device according to the present invention does not need to have a molding step with an exterior material after disposing the ceramic element and the like in the cavity for resin molding and is excellent in productivity. Moreover, since the main surfaces of the ceramic element are perpendicular to the mounting portions, the mounting area can be reduced effectively.

For example, the case may include a first outer side surface and a second outer side surface substantially perpendicular to the first and second main surfaces and the first and second mounting portions and facing in opposite directions,
  a distance from a tip of the first mounting portion to the first outer side surface may be smaller than that from the tip of the first mounting portion to the recess, and
  a distance from a tip of the second mounting portion to the second outer side surface may be smaller than that from the tip of the second mounting portion to the recess.

In such an electronic device, since the first mounting portion and the second mounting portion extend from the recess toward the outer side surfaces of the case along the opening edge, the first metal terminal and the second metal terminal are securely supported by the case, and the mounting posture becomes stable. Thus, it is possible to effectively prevent overturn during mounting.

For example, the ceramic element may include a first element portion and a second element portion each having the first main surface, the second main surface, the first electrode portion, and the second electrode portion,
  the first element portion and the second element portion may be arranged side by side in the recess along a length direction of the case in a posture where the first main surface of the first element portion and the first main surface of the second element portion face in opposite directions,
  the first electrode connection portion may be connected to the first electrode portion of the first element portion,
  the second electrode connection portion may be connected to the second electrode portion of the second element portion, and
  the electronic device may comprise a third metal terminal connecting between the second electrode portion of the first element portion and the first electrode portion of the second element portion.

The first element portion and the second element portion may be arranged in the recess so that:
  the first main surface of the first element portion and the second main surface of the second element portion are located on substantially the same plane; and
  the second main surface of the first element portion and the first main surface of the second element portion are located on substantially the same plane.

The ceramic element disposed in the recess may be one single plate ceramic element, but may be a combination of a plurality of plate-shaped portions like the first element portion and the second element portion. Such an electronic device has a small mounting area and is configured by two element portions connected in series.

For example, the third metal terminal may include:
  a third electrode connection portion connecting between the second electrode portion of the first element portion and the first electrode portion of the second element portion; and
  a third mounting portion disposed on the opening edge and being substantially perpendicular to the first main surface and the second main surface.

Such an electronic device can change the connection state of the two element portions to the circuit or the like by changing the connection to the third mounting portion.

For example, the ceramic element may include a first element portion and a second element portion each having the first main surface, the second main surface, the first electrode portion, and the second electrode portion,
  the first element portion and the second element portion may be arranged side by side in the recess along a length direction of the case in a posture where the first main surface of the first element portion and the first main surface of the second element portion face in the same direction,
  the first electrode connection portion may be connected to both of the first electrode portions of the first element portion and the second element portion, and the second electrode connection portion may be connected to both of the second electrode portions of the first element portion and the second element portion.

The first element portion and the second element portion may be arranged in the recess so that:
the first main surface of the first element portion and the first main surface of the second element portion are located on substantially the same plane; and
the second main surface of the first element portion and the second main surface of the second element portion are located on substantially the same plane.

Such an electronic device has a small mounting area and is configured by two element portions connected in parallel.

For example, at least a part of the opening edge of the case may be visible from below.

In such an electronic device, at least a part of the opening of the recess is exposed, the structure is simple, and the productivity is good.

For example, the case may have a substantially hexagonal columnar shape whose outer side surfaces are all non-parallel to the first main surface and the second main surface.

Such an electronic device can improve the stability during mounting while maintaining a small mounting area.

For example, the electronic device according to the present invention may comprise:
a groove unit formed on a third outer side surface of the case; and
a protrusion unit formed on a fourth outer side surface of the case and corresponding to a shape of the groove unit.

In such an electronic device, a plurality of electronic devices can be transported at once, for example, when transported to a mounting board using a mounting machine by connecting the plurality of electronic devices to each other, and the mounting efficiency can thus be improved.

For example, the first metal terminal may include a first folded portion extending upward along outer side surfaces of the case from a tip of the first mounting portion, and
the second metal terminal may include a second folded portion extending upward along outer side surfaces of the case from a tip of the second mounting portion.

In such an electronic device including the metal terminals, a solder fillet is easily formed during mounting, and a good mountability is exhibited.

BRIEF DESCRIPTION OF THE DRAWING(S)

FIG. 8 is a conceptual diagram illustrating an electronic device according to Third Embodiment of the present invention;

DETAILED DESCRIPTION OF THE INVENTION

Hereinafter, the present invention is explained based on embodiments shown in the figures.

First Embodiment

Figure 1:
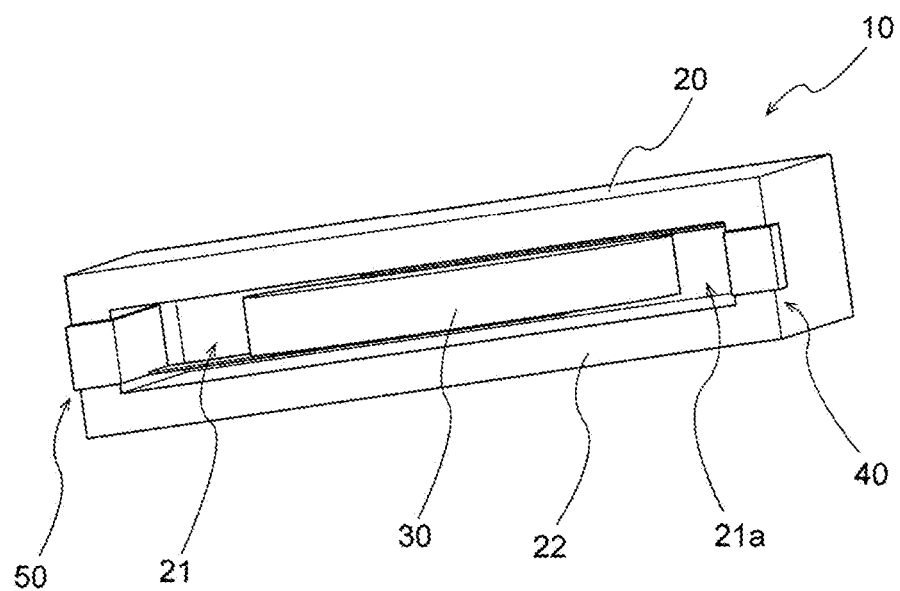
FIG. 1 is a schematic oblique view of an electronic device according to First Embodiment of the present invention as viewed from diagonally below.
Figure 4:
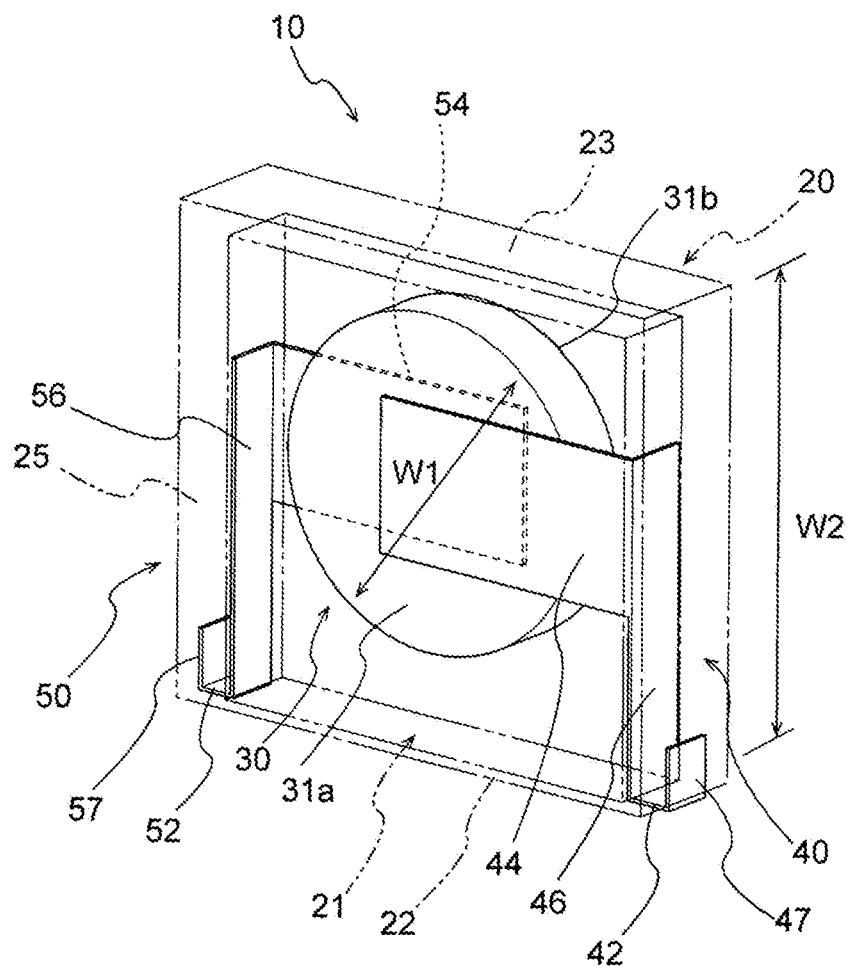
FIG. 4 is a perspective oblique view of a case of the electronic device shown in FIG. 1.

FIG. 1 is a schematic oblique view of an electronic device 10 according to First Embodiment of the present invention from its bottom surface side. As shown in FIG. 1, the electronic device 10 includes a case 20 and a ceramic element 30 disposed in a recess 21 of the case 20. As understood from FIG. 4, which illustrates an internal state of the electronic device 10, the electronic device 10 includes a first metal terminal 40 and a second metal terminal 50 connected to the ceramic element 30 disposed in the recess 21. FIG. 4 is a conceptual diagram illustrating a state of the electronic device 10 in which the case 20 is seen through. In FIG. 4, the case 20 is illustrated by virtual lines (dashed-dotted lines).

Figure 2:
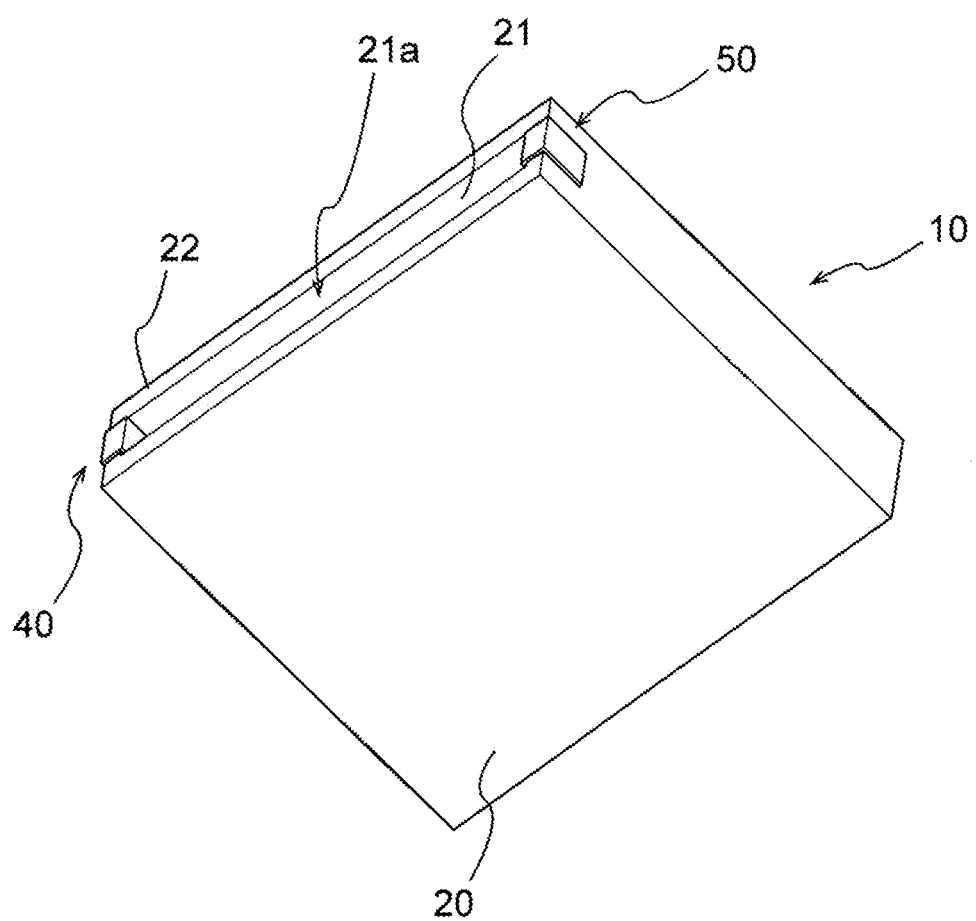
FIG. 2 is an oblique view of the electronic device shown in FIG. 1 as viewed from another angle.

FIG. 2 is an oblique view of the electronic device 10 as viewed from side. As shown in FIG. 1 and FIG. 2, the electronic device 10 has a substantially rectangular flat plate shape or a rectangular parallelepiped shape whose lengths in two directions are substantially equal, and length in one direction is shorter than the lengths in the other two directions, among the lengths in three directions. However, the electronic device 10 is not limited to this and may have another polygonal flat plate shape other than rectangle or a polygonal columnar shape other than a rectangular parallelepiped (see FIG. 6). As understood from the comparison between FIG. 2 and FIG. 4, the side of the electronic device 10 in which an opening 21a of the recess 21 formed in the case 20 is formed is the mounting surface side opposing to a board or the like as a mounting target when the electronic device 10 is mounted.

As shown in FIG. 1, the case 20 includes the recess 21 and an opening edge 22 surrounding the opening 21a of the recess 21. As shown in FIG. 2, the opening 21a of the recess 21 is formed on any of four surfaces each having a smaller area, not on two surfaces each having a larger area, among the surfaces of the case 20. This can reduce the mounting area of the electronic device 10.

Figure 3:
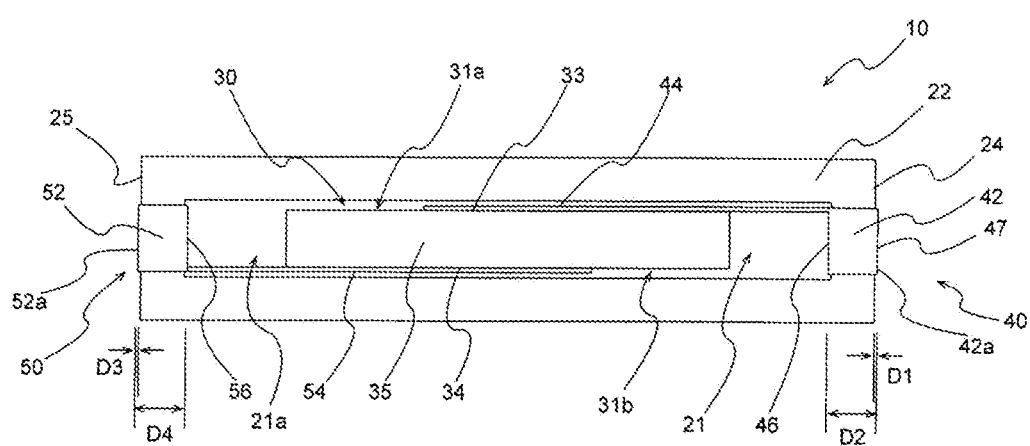
FIG. 3 is a bottom view of the electronic device shown in FIG. 1.

FIG. 3 is a bottom view of the electronic device 10 as viewed from its mounting surface side. The case 20 accommodates the ceramic element 30 and the like in the recess 21. The opening 21a of the recess 21 has a rectangular shape smaller than the outer shape of the case 20. As shown in FIG. 4, the recess 21 forms a substantially rectangular parallelepiped space in the case 20. An upper bottom 23 of the case 20 is formed in an upper part of the electronic device 10 on the opposite side of the opening 21a of the recess 21.

As shown in FIG. 3, the opening edge 22 is made of a frame-shaped plane surrounding the opening 21a. The opening edge 22 is substantially perpendicular to a first main surface 31a and a second main surface 31b of the ceramic element 30 described below. The shape of the opening edge 22 may be different from that of the opening edge 22 shown in FIG. 3 depending on the shape of the opening 21a, the outer circumferential shape of the case 20, and the like (see FIG. 7 etc.).

As shown in FIG. 3, a first mounting portion 42 of the first metal terminal 40 and a second mounting portion 52 of the second metal terminal 50 are arranged on the opening edge 22.

As shown in FIG. 3 and FIG. 4, the ceramic element 30 is disposed in the recess 21 of the case 20. As shown in FIG. 3, the ceramic element 30 includes the first main surface 31a and the second main surface 31b opposing to each other and has a substantially disk-shaped outer shape. However, the ceramic element 30 may have a shape other than the disk shape, such as an elliptical disk shape and a rectangular flat plate shape. The first main surface 31a and the second main surface 31b are a pair of surfaces having the largest area in the ceramic element 30. In the description of the ceramic element 30, as shown in FIG. 3, one of the two main surfaces is referred to as the first main surface 31a, and the other is referred to as the second main surface 31b, but the first main surface 31a and the second main surface may be interchanged with each other with respect to the state shown in the figures.

As shown in FIG. 3, which is a bottom view of the electronic device 10, the ceramic element 30 includes a first electrode portion 33 formed on the first main surface 31a, a second electrode portion 34 formed on the second main surface 31b, and a dielectric portion 35 interposed between the first electrode portion 33 and the second electrode portion 34. The material of the dielectric portion 35 is not limited and is, for example, a dielectric material, such as calcium titanate, strontium titanate, barium titanate, and a mixture thereof. The ceramic element 30 is not limited to a capacitor or the like interposing the dielectric portion 35 between the first electrode portion 33 and the second electrode portion 34. For example, the ceramic element may be a varistor or a thermistor interposing a semiconductor ceramics between the first electrode portion and the second electrode portion.

The first electrode portion 33 and the second electrode portion 34 are also made of any material and are normally made of copper, a copper alloy, nickel, a nickel alloy, or the like, but can also be made of silver, an alloy of silver and palladium, or the like. The first electrode portion 33 and the second electrode portion 34 have any thickness, but normally have a thickness of about 10 to 50 μm. In addition, at least one metal film selected from Ni, Cu, Sn, etc. may be formed on the surfaces of the first and second electrode portions 33 and 34.

As shown in FIG. 4, the ceramic element 30 is disposed in the recess 21 so that the first main surface 31a and the second main surface 31b face the direction perpendicular to the opening 21a. Thus, W2 is larger than W1, where W1 is a diameter of the ceramic element 30, and W2 is a depth from the opening 21a of the case 20 to the upper bottom 23 of the recess 21. As a result, the electronic device 10 can accommodate the whole of the ceramic element 30 in the recess 21 without exposing a part of the ceramic element 30 from the opening 21a of the recess 21. In the electronic device 10, the recess 21 may be filled with a mold resin. In such a case, the whole of the ceramic element 30 can be covered with the mold resin.

As shown in FIG. 4, the case 20 does not include a lid for closing the opening 21a. Thus, as shown in FIG. 3, in the electronic device 10, at least a part of the opening edge 22 of the case 20, that is, the rest of the opening edge 22 excluding the first mounting portion 42 and the second mounting portion 52 is visible from below. Since the case 20 has a simple shape with no lid, the electronic device 10 is excellent in productivity.

Figure 5:
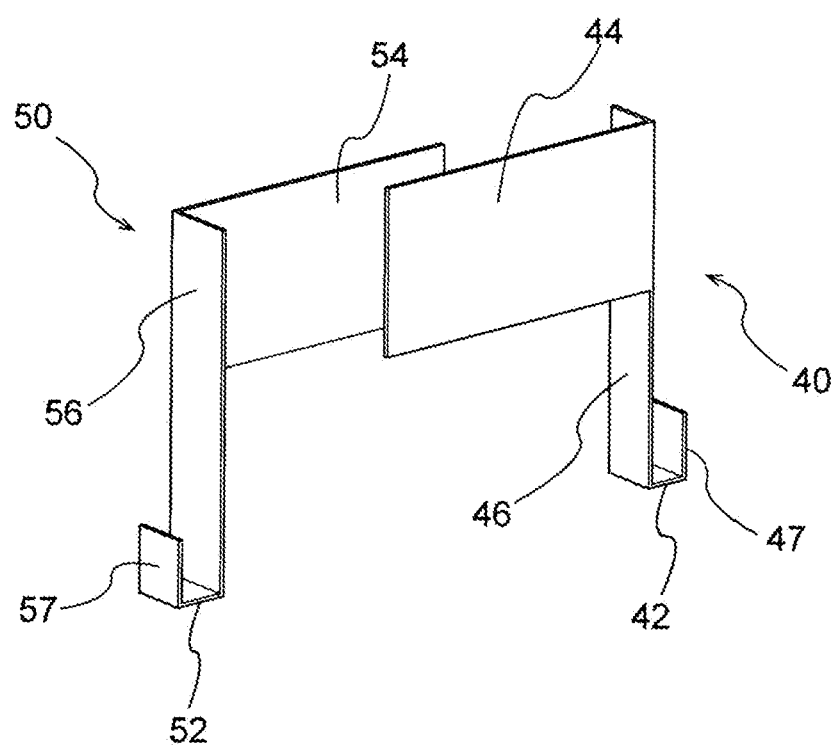
FIG. 5 is an oblique view illustrating first and second metal terminals of the electronic device shown in FIG. 1.

FIG. 5 is a schematic oblique view illustrating the first metal terminal 40 and the second metal terminal 50 of the electronic device 10. As shown in FIG. 3 to FIG. 5, the electronic device 10 includes a pair of metal terminals 40 and 50. The first metal terminal 40 and the second metal terminal 50 are arranged away and electrically insulated from each other in the electronic device 10. The first metal terminal 40 and the second metal terminal 50 are formed by, for example, machining a conductive metal plate, but the metal terminals 40 and 50 are formed by any method.

As shown in FIG. 3 to FIG. 5, the first metal terminal 40 includes the first mounting portion 42 disposed on the opening edge 22, a first electrode connection portion 44 connected to the first electrode portion 33 of the ceramic element 30, a first terminal arm portion 46 connecting between the first mounting portion 42 and the first electrode connection portion 44, and a first folded portion 47 extending upward from a tip 42a of the first mounting portion 42. Similarly to the ceramic element 30, as shown in FIG. 4, the first electrode connection portion 44 and the first terminal arm portion 46 are accommodated in the recess 21 of the case 20.

As shown in FIG. 3 and FIG. 4, the first electrode connection portion 44 extends in substantially parallel to the first main surface 31a of the ceramic element 30 and is connected to the first electrode portion 33 formed on the first main surface 31a via solder, conductive adhesive, or the like. Meanwhile, the first mounting portion 42 is disposed on one side of the opening edge 22 (the first outer side surface 24 side of the case 20).

As shown in FIG. 4 and FIG. 5, the first terminal arm portion 46 of the first metal terminal 40 connects between the first electrode connection portion 44 inside the recess 21 and the first mounting portion 42 outside the recess 21. As shown in FIG. 3 and FIG. 4, the first mounting portion 42 is substantially perpendicular to the first main surface 31a and the second main surface 31b of the ceramic element 30.

As shown in FIG. 3 and FIG. 4, the case 20 includes the first main surface 31a and the second main surface 31b of the ceramic element 30 and a first outer side surface 24 and a second outer side surface 25 perpendicular to the first mounting portion 42 and the second mounting portion 52 of the metal terminals 40 and 50. That is, among the four outer side surfaces of the case 20, the first outer side surface 24 and the second outer side surface 25 are a pair of outer surfaces opposing to each other and are smaller than the other outer side surfaces excluding the first outer side surface 24 and the second outer side surface 25. Among the outer surfaces of the case 20, the surfaces perpendicular to the opening edge 22 are the outer side surfaces.

As shown in FIG. 3, the tip 42a of the first mounting portion 42 is an end of the first mounting portion 42 opposite to the end connected to the first terminal arm portion 46 and is connected to the first folded portion 47. D1 is smaller than D2, where D1 is a distance from the tip 42a of the first mounting portion 42 to the first outer side surface 24, and D2 is a distance from the tip 42a of the first mounting portion 42 to the recess 21. The first mounting portion 42 can have a predetermined area or more along the opening edge 22 and exhibits a good mountability.

As shown in FIG. 4, the first folded portion 47 of the first metal terminal 40 extends upward from the tip 42a of the mounting portion 42 along the first outer side surface 24 of the case 20. Since the first metal terminal 40 includes the first folded portion 47, a solder fillet is easily formed during mounting, and the electronic device 10 including the first folded portion 47 exhibits a good mountability. As shown in FIG. 4, since the first metal terminal 40 includes the first terminal arm portion 46, the first mounting portion 42, and the first folded portion 47, the first metal terminal 40 has a J-shaped tip. Thus, in the electronic device 10, the case 20 is partly interposed between the first terminal arm portion 46 and the first folded portion 47, and the first metal terminal 40 can thereby more strongly be engaged with the case 20.

As shown in FIG. 3 to FIG. 5, the second metal terminal 50 includes the second mounting portion 52 disposed on the opening edge 22, a second electrode connection portion 54 connected to the second electrode portion 34 of the ceramic element 30, a second terminal arm portion 56 connecting between the second mounting portion 52 and the second electrode connection portion 54, and a second folded portion 57 extending upward from a tip 52a of the second mounting portion 52. Similarly to the first electrode connection portion 44, the second electrode connection portion 54 is accommodated in the recess 21 of the case 20. The second metal terminal 50 has substantially the same shape as the first metal terminal 40 and is disposed substantially symmetrically to the first metal terminal 40. However, the second metal terminal 50 is not limited to the one having the same shape as the first metal terminal 40.

As shown in FIG. 3 and FIG. 4, the second electrode connection portion 54 extends in substantially parallel to the second main surface 31b of the ceramic element 30 and is connected to the second electrode portion 34 formed on the second main surface 31b via solder, conductive adhesive, or the like. Meanwhile, the second mounting portion 52 is disposed on the other side of the opening edge 22 (the second outer side surface 25 side of the case 20).

As shown in FIG. 4 and FIG. 5, the second terminal arm portion 56 of the second metal terminal 50 connects between the second electrode connection portion 54 inside the recess 21 and the second mounting portion 52 outside the recess 21. As shown in FIG. 3 and FIG. 4, the second mounting portion 52 is substantially perpendicular to the first main surface 31a and the second main surface 31b of the ceramic element 30.

As shown in FIG. 3, the tip 52a of the second mounting portion 52 is an end of the second mounting portion 52 opposite to the end connected to the second terminal arm portion 56 and is connected to the second folded portion 57. D3 is smaller than D4, where D3 is a distance from the tip 52a of the second mounting portion 52 to the second outer side surface 25, and D4 is a distance from the tip 52a of the second mounting portion 52 to the recess 21. The second mounting portion 52 can have a predetermined area or more along the opening edge 22 and exhibits a good mountability.

As shown in FIG. 4, the second folded portion 57 of the second metal terminal 50 extends upward from the tip 52a of the second mounting portion 52 along the second outer side surface 25 of the case 20. The second metal terminal 50 including the second folded portion 57 exhibits effects similar to those of the first metal terminal 40 including the first folded portion 47.

The first metal terminal 40 and the second metal terminal 50 shown in FIG. 5 and the like are made of any metal material having conductivity, such as iron, nickel, copper, silver, and an alloy containing these. A metal film, such as Ni, Sn, and Cu, may be formed on the surfaces of the first metal terminal 40 and the second metal terminal 50.

The recess 21 of the case 20 shown in FIG. 3 and FIG. 4 may be filled with a mold resin for filling the gap between: the inner wall (including the bottom surface 21c) of the recess 21; and the ceramic element 30 and the metal terminals 40 and 50. This can improve the strength, insulating property, and the like of the electronic device 10. However, the recess 21 is not necessarily filled with resin. As shown in FIG. 3, a gap may be formed between: the inner wall of the recess 21; and the ceramic element 30 and the metal terminals 40 and 50.

The case 20 can be manufactured by, for example, injection molding with resin. However, the material of the case 20 is not limited to only resin.

The electronic device 10 shown in FIG. 1 to FIG. 5 can be manufactured by, for example, the following steps. First, the ceramic element 30 and the first and second metal terminals 40 and 50 are prepared, and the first metal terminal 40 and the second metal terminal 50 are connected to the ceramic element 30. The ceramic element 30 and the first and second metal terminals 40 and 50 can be connected by solder, conductive adhesive, or the like.

Next, an intermediate manufactured product formed by integrating the first metal terminal 40, the second metal terminal 50, and the ceramic element 30 is disposed in the recess 21 of the case 20. After that, if necessary, a mold resin is injected into the recess 21 to obtain the electronic device 10 shown in FIG. 1. As described above, since the ceramic element 30 is accommodated in the recess 21 of the case 20, the electronic device 10 shown in FIG. 1 to FIG. 5 does not need to have a molding step with an exterior material after disposing the ceramic element 30 and the like in the cavity for resin molding and is excellent in productivity.

Since the ceramic element 30 and the like can be accommodated in the case 20, the electronic device 10 can flexibly respond to a change in the size of the ceramic element 30 as long as the ceramic element 30 and the like can be accommodated in the case 20. Moreover, since the first mounting portion 42 and the second mounting portion 52 are perpendicular to the first main surface 31a and the second main surface 31b of the ceramic element 30, the electronic device 10 can have a small mounting area and is suitable for surface mounting.

Second Embodiment

Figure 6:
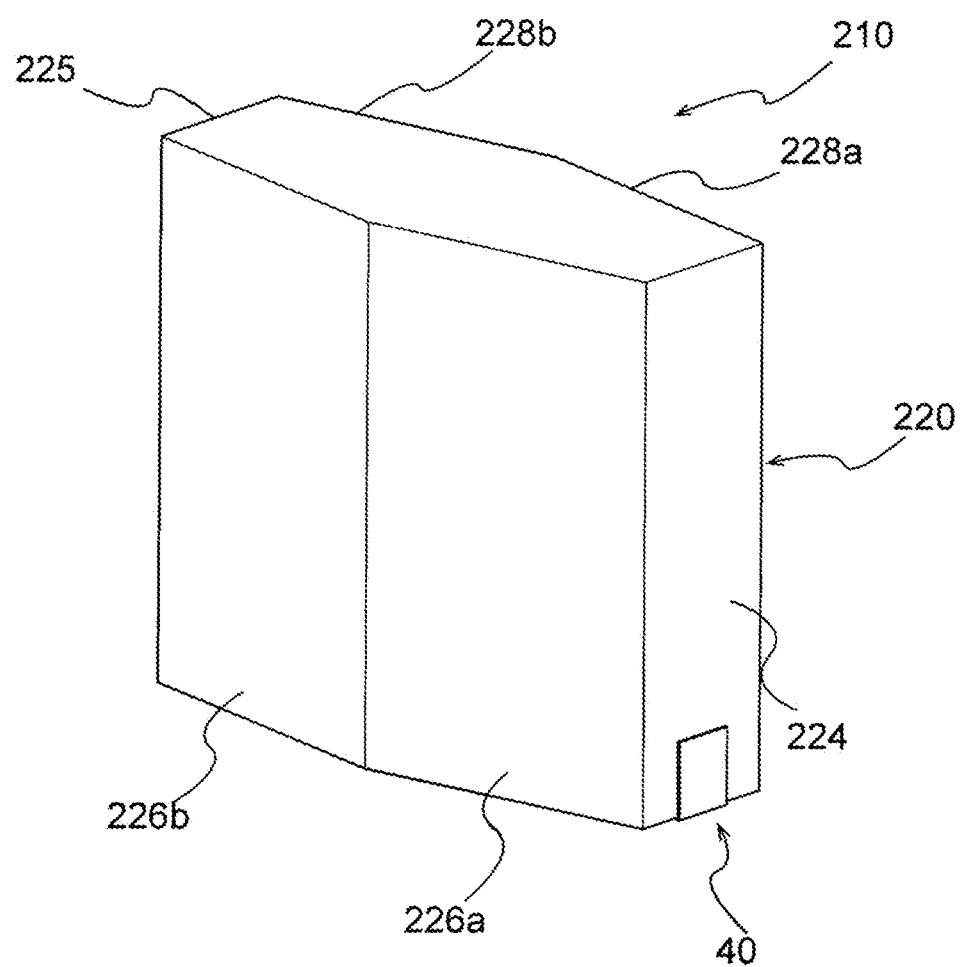
FIG. 6 is a schematic oblique view of an electronic device according to Second Embodiment of the present invention.
Figure 7:
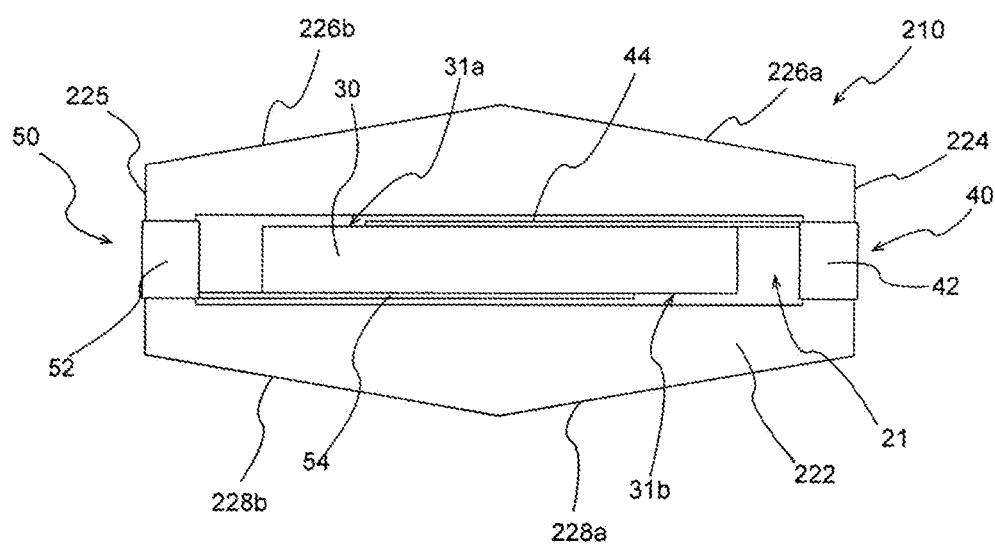
FIG. 7 is a bottom view of the electronic device shown in FIG. 6.

FIG. 6 is a schematic oblique view of an electronic device 210 according to Second Embodiment of the present invention, and FIG. 7 is a bottom view of the electronic device 210. As shown in FIG. 6 and FIG. 7, the electronic device 210 is different from the electronic device 10 shown in FIG. 1 and FIG. 2 in terms of the outer shape of a case 220. In other respects, however, the electronic device 210 is similar to the electronic device 10. In the description of the electronic device 210, only the differences from the electronic device 10 are described, and common respects with the electronic device 10 are not described.

As shown in FIG. 6 and FIG. 7, each of outer side surfaces 224, 225, 226a, 226b, 228a, and 228b of the case 220 has a substantially hexagonal column shape that is non-parallel to the first main surface 31a and the second main surface 31b of the ceramic element 30. As shown in FIG. 7, however, the internal shapes of the case 220, such as the shape of the recess 21, are similar to those of the case 20 shown in FIG. 3.

As shown in FIG. 6 and FIG. 7, the case 220 includes six outer side surfaces perpendicular to an opening edge 222 surrounding the opening 21a of the recess 21. The six outer side surfaces of the case 220 include a first outer side surface 224, a second outer side surface 225, a third outer side surface 226b, a fourth outer side surface 228a, a fifth outer side surface 226a, and a sixth outer side surface 228b.

As shown in FIG. 7, the first outer side surface 224 and the second outer side surface 225 are a pair of outer side surfaces opposing to each other and are similar to the first outer side surface 24 and the second outer side surface 25 shown in FIG. 3. As shown in FIG. 7, the fifth outer side surface 226a is connected to the first outer surface 224 with an included angle of larger than 90 degrees, and the third outer side surface 226b is connected to the second outer side surface 225 with an included angle of larger than 90 degrees. The fifth outer side surface 226a and the third outer side surface 226b have substantially the same area and are connected to each other with an included angle of larger than 90 degrees at the central part of the electronic device 210.

As shown in FIG. 6 and FIG. 7, the fourth outer side surface 228a and the sixth outer side surface 228b are symmetrical to the fifth outer side surface 226a and the third outer side surface 226b, respectively. That is, the fourth outer side surface 228a is connected to the first outer side surface 224 with an included angle of larger than 90 degrees, and the sixth outer side surface 228b is connected to the second outer side surface 225 with an included angle of larger than 90 degrees. The fourth outer side surface 228a and the sixth outer side surface 228b have substantially the same area and are connected to each other with an included angle of larger than 90 degrees at the central part of the electronic device 210.

As shown in FIG. 6 and FIG. 7, the first and second outer side surfaces 224 and 225 are substantially perpendicular to the first main surface 31a and the second main surface 31b, whereas the fourth to sixth outer side surfaces are arranged diagonally to the first main surface 31a and the second main surface 31b. In the electronic device 210, as shown in FIG. 7, the width of the opening edge 222 in the direction perpendicular to the first main surface 31a and the second main surface 31b is small on both sides near the first and second outer surfaces 224 and 225 and is large at the central part. The electronic device 210 can prevent itself from tipping over in the mounting posture with a small mounting area.

As for common respects with the electronic device 10 according to First Embodiment, the electronic device 210 according to Second Embodiment exhibits effects similar to those of the electronic device 10.

Third Embodiment

Figure 8:
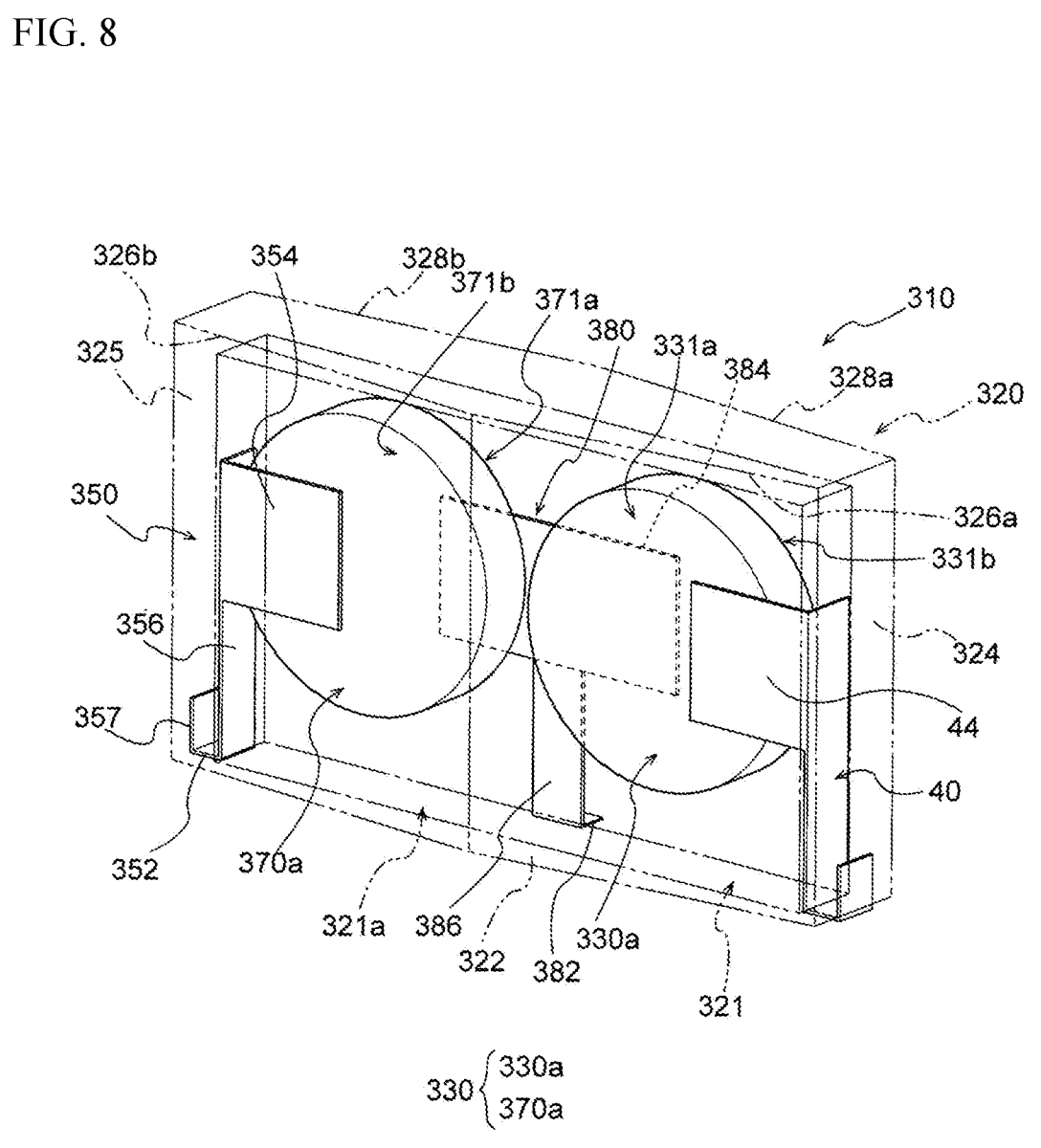

FIG. 8 is a schematic oblique view of an electronic device 310 according to Third Embodiment of the present invention. Similarly to the electronic device 10 shown in FIG. 3, FIG. 8 illustrates the inside of a case 320 of the electronic device 310 in a transparent manner and illustrates the case 320 by virtual lines.

As shown in FIG. 8, the electronic device 310 is different from the electronic device 210 shown in FIG. 6 and FIG. 7 in terms of two short plate-shaped dielectric elements of a first element portion 330a and a second element portion 370a included in a ceramic element 330, the shape of a second metal terminal 350, and a third metal terminal 380 included in the ceramic element 330. Except that the dimension in the length direction (the distance between a first outer side surface 324 and a second outer side surface 325) is about twice, however, the case 320 of the electronic device 310 is similar to the case 220 of the electronic device 210 according to Second Embodiment. In the description of the electronic device 310, only the differences from the electronic device 210 are described, and common respects with the electronic device 210 are not described.

As shown in FIG. 8, the ceramic element 330 of the electronic device 310 includes two element portions of the first element portion 330a and the second element portion 370a. The first element portion 330a and the second element portion 370a are arranged in a recess 321 of the case 320. Similarly to the case 220 shown in FIG. 6 and FIG. 7, the case 320 includes a first outer side surface 324, a second outer side surface 325, a fifth outer side surface 326a, a third outer side surface 326b, a fourth outer side surface 328a, and a sixth outer side surface 328b and has a substantially hexagonal columnar outer shape. Similarly to the case 220 shown in FIG. 7, the case 320 surrounds an opening 321a of the recess 321 and includes an opening edge 322 facing the mounting surface side (lower side).

The first element portion 330a and the second element portion 370a arranged in the recess 321 of the case 320 include first main surfaces 331a and 371a and second main surfaces 331b and 371b and are similar to the ceramic element 30 included in each of the electronic devices 10 and 210 of First and Second Embodiments. That is, similarly to the ceramic element 30 shown in FIG. 3, each of the first element portion 330a and the second element portion 370a includes a first electrode portion formed on the first main surface 331a (371a), a second electrode portion formed on the second main surfaces 331b (371b), and a dielectric portion interposed between the first electrode portion and the second electrode portion (see the first electrode portion 33, the second electrode portion 34, and the dielectric portion 35 in FIG. 3).

As shown in FIG. 8, the first element portion 330a and the second element portion 370a are arranged in the recess 321 of the case 320 so that the first main surface 331a of the first element portion 330a and the second main surface 371b of the second element portion 370a are located on substantially the same plane. Moreover, the first element portion 330a and the second element portion 370a are arranged in the recess 321 of the case 320 so that the second main surface 331b of the first element portion 330a and the first main surface 371a of the second element portion 370a are located on substantially the same surface.

That is, the first element portion 330a and the second element portion 370a are arranged side by side in the recess 321 along the length direction of the case 320 in a posture in which the first main surface 331a of the first element portion 330a and the first main surface 371a of the second element portion 370a face in opposite directions.

As shown in FIG. 8, the first metal terminal 40 has a shape similar to that of the first metal terminal 40 shown in FIG. 4 and FIG. 7. The first electrode connection portion 44 of the first metal terminal 40 of the electronic device 310 is connected to the first electrode portion formed on the first main surface 331a of the first element portion 330a.

On the other hand, unlike the second metal terminal 50 shown in FIG. 4 and FIG. 7, the second metal terminal 350 shown in FIG. 8 is line-symmetry to the first metal terminal 40 based on the center line of the electronic device 310. The second metal terminal 350 includes a second mounting portion 352 disposed on the opening edge portion 322, a second electrode connection portion 354 connected to the second electrode portion of the second element portion 370a, a second terminal arm portion 356 connecting between the second mounting portion 352 and the second electrode connection portion 354, and a second folded portion 357 extending upward from the tip of the second mounting portion 352. Except for the connection position between the second electrode connection portion 354 and the second terminal arm portion 356, however, the second metal terminal 350 is similar to the second metal terminal 50 shown in FIG. 4 and FIG. 7.

As shown in FIG. 8, the electronic device 310 includes a third metal terminal 380 connecting between a second electrode portion formed on the second main surface 331b of the first element portion 330a and a first electrode portion formed on the first main surface 371a of the second element portion 370a. The third metal terminal 380 includes a third electrode connection portion 384 connecting between the second electrode portion of the first element portion 330a and the first electrode portion of the second element portion 370a, a third mounting portion 382 disposed on the opening edge 322, and a third terminal arm portion 386 connecting between the third electrode connection portion 384 and the third mounting portion 382.

The third electrode connection portion 384 and the third terminal arm portion 386 of the third metal terminal 380 are arranged inside the recess 321, and the third mounting portion 382 is exposed outside the recess 321. Similarly to the second mounting portion 352, the third mounting unit 382 is substantially perpendicular to the first main surfaces 331a and 371a and the second main surfaces 331b and 371b.

The electronic device 310 shown in FIG. 8 has a small mounting area and can be configured by the first element portion 330a and the second element portion 370a connected in series. Since the third metal terminal 380 includes the third mounting portion 382, the electronic device 310 can change the connection state of the first element portion 330a and the second element portion 370a to the circuit or the like and can also be configured differently from the series connection of the first element portion 330a and the second element portion 370a.

As for common respects with the electronic device 210 according to Second Embodiment, the electronic device 310 according to Third Embodiment exhibits effects similar to those of the electronic device 210.

Fourth Embodiment

Figure 9:
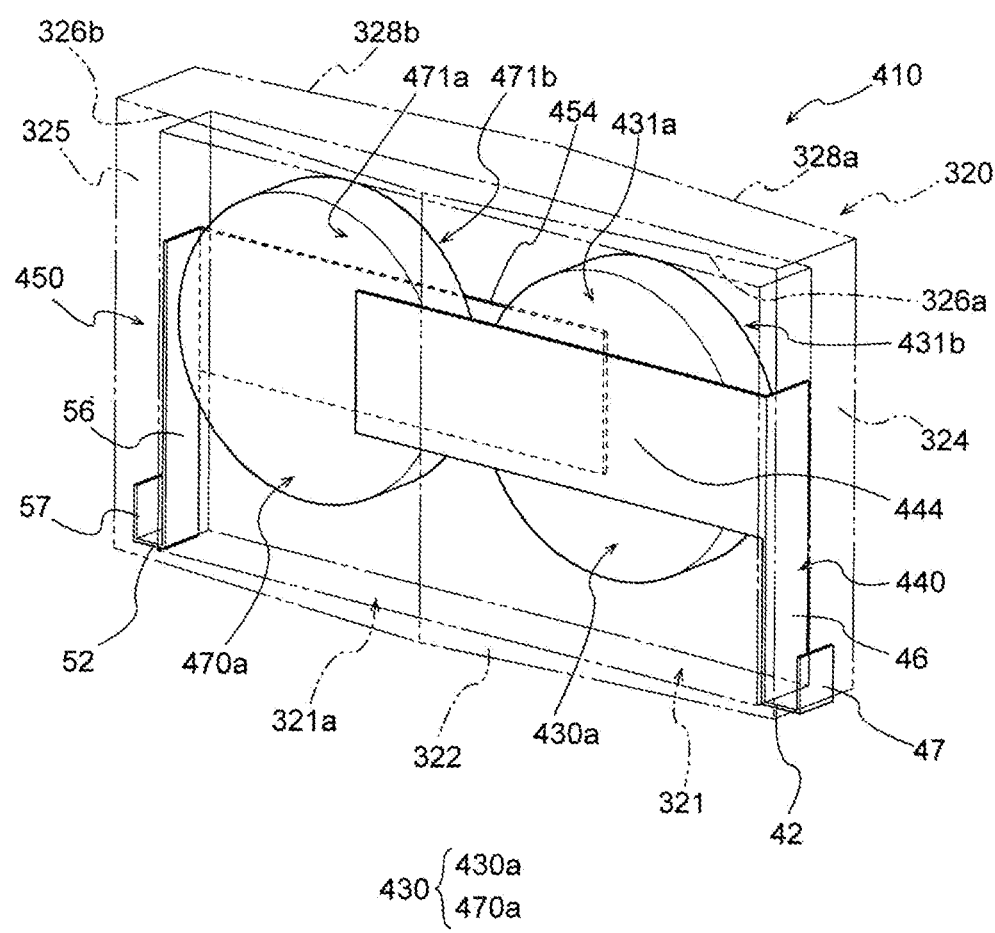
FIG. 9 is a conceptual diagram illustrating an electronic device according to Fourth Embodiment of the present invention.

FIG. 9 is a schematic oblique view of an electronic device 410 according to Fourth Embodiment of the present invention. Similarly to the electronic device 310 shown in FIG. 8, FIG. 9 illustrates the inside of a case 320 of the electronic device 410 in a transparent manner and illustrates the case 320 by virtual lines.

As shown in FIG. 9, the electronic device 410 is different from the electronic device 210 shown in FIG. 6 and FIG. 7 in terms of two short plate-shaped dielectric elements of a first element portion 430a and a second element portion 470a included in a ceramic element 430 and the shapes of a first metal terminal 440 and a second metal terminal 450, but the case 320 of the electronic device 410 is similar to the case 320 of the electronic device 310. In the description of the electronic device 410, only the differences from the electronic device 210 or the electronic device 310 are described, and common respects with the electronic device 210 or the electronic device 310 are not described.

As shown in FIG. 9, the ceramic element 430 of the electronic device 410 includes two element portions of the first element portion 430a and the second element portion 470a. The first element portion 430a and the second element portion 470a are arranged in the recess 321 of the case 320.

The first element portion 430a and the second element portion 470a arranged in the recess 321 of the case 320 include first main surfaces 431a and 471a and second main surfaces 431b and 471b and are similar to the ceramic element 30 included in each of the electronic devices 10 and 210 according to First and Second Embodiments. That is, similarly to the ceramic element 30 shown in FIG. 3, each of the first element portion 430a and the second element portion 470a includes a first electrode portion formed on the first main surfaces 431a (471a), a second electrode portion formed on the second main surface 431b (471b), and a dielectric portion interposed between the first electrode portion and the second electrode portion (see the first electrode portion 33, the second electrode portion 34, and the dielectric portion 35 in FIG. 3).

As shown in FIG. 9, the first element portion 430a and the second element portion 470a are arranged in the recess 321 of the case 320 so that the first main surface 431a of the first element portion 430a and the first main surface 471a of the second element portion 470a are located on substantially the same plane. Moreover, the first element portion 430a and the second element portion 470a are arranged in the recess 321 of the case 320 so that the second main surface 431b of the first element portion 430a and the second main surface 471b of the second element portion 470a are located on substantially the same surface.

That is, the first element portion 430a and the second element portion 470a are arranged side by side in the recess 321 along the length direction in a posture in which their first main surface 431a and 471a face in the same direction.

As shown in FIG. 9, the first metal terminal 440 is different from the first metal terminal 40 shown in FIG. 4 and FIG. 7 in terms of the shape of a first electrode connection portion 444, but is similar to the first metal terminal 40 in terms of the first mounting portion 42, the first terminal arm portion 46, and the first folded portion 47. As shown in FIG. 9, the first electrode connection portion 444 is extended in the length direction of the electronic device 410. The first electrode connection portion 444 is connected to the first electrode portion formed on both of the first main surfaces 431a and 471a of the first element portion 430a and the second element portion 470a.

The second metal terminal 450 is different from the second metal terminal 50 shown in FIG. 4 and FIG. 7 in terms of the shape of a second electrode connection portion 454, but is similar to the second metal terminal 50 in terms of the second mounting portion 52, the second terminal arm portion 56, and the second folded portion 57. As shown in FIG. 9, similarly to the first electrode connection portion 444, the second electrode connection portion 454 is extended in the length direction of the electronic device 410. The second electrode connection portion 454 is connected to the second electrode portion formed on both of the second main surfaces 431b and 471b of the first element portion 430a and the second element portion 470a.

In the electronic device 410, as shown in FIG. 9, the first electrode connection portion 444 connects between the first electrode portions of the first element portion 430a and the second element portion 470a, and the second electrode connection portion 454 connects between the second electrode portions of the first element portion 430a and the second element portion 470a. Since the electronic device 410 includes the first electrode connection portion 444 and the second electrode connection portion 454, the electronic device 410 has a small mounting area and is configured by the dielectric portions of the two element portions connected in parallel.

As for common respects with the electronic device 210 according to Second Embodiment, the electronic device 410 according to Fourth Embodiment exhibits effects similar to those of the electronic device 210.

Fifth Embodiment

Figure 10:
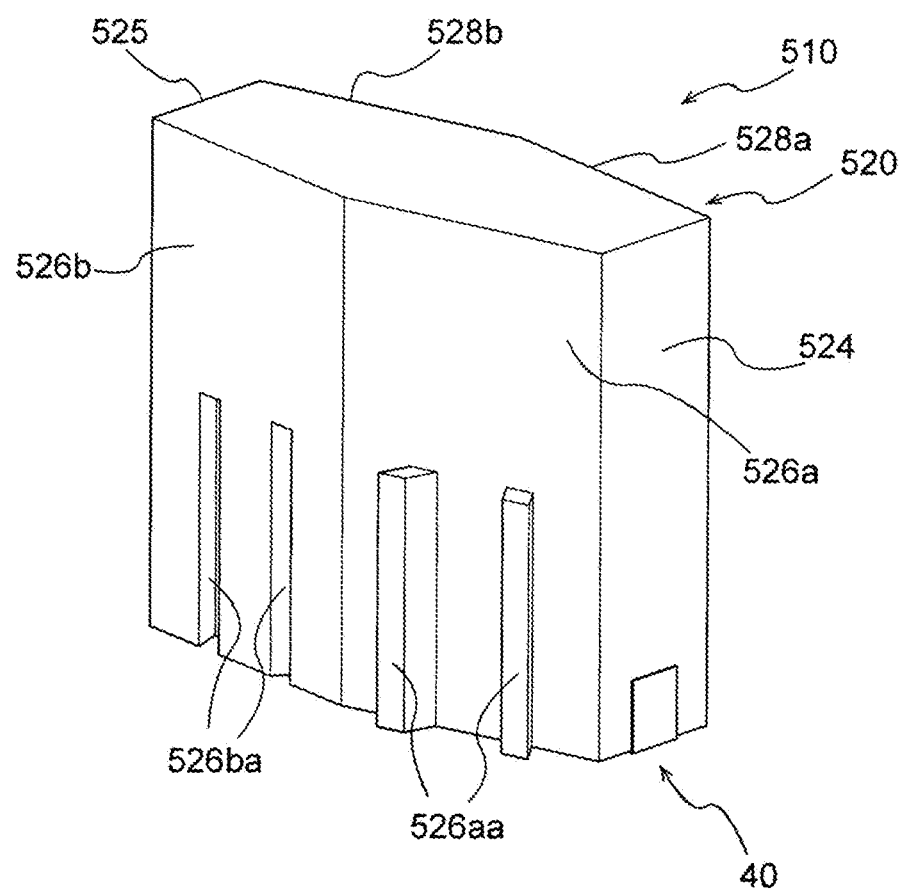
FIG. 10 is a perspective view illustrating an electronic device according to Fifth Embodiment of the present invention.
Figure 11:
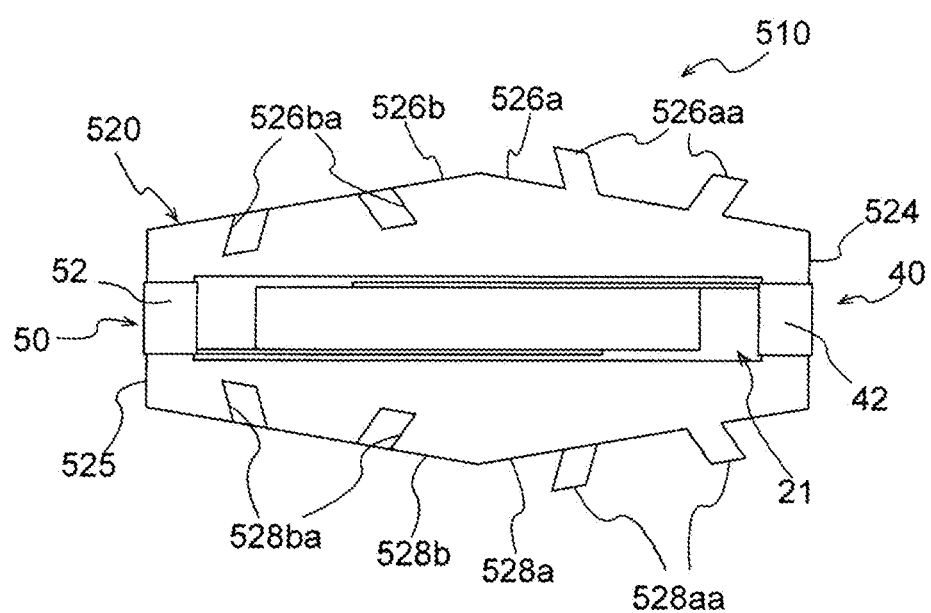
FIG. 11 is a bottom view of the electronic device shown in FIG. 10.
Figure 12:
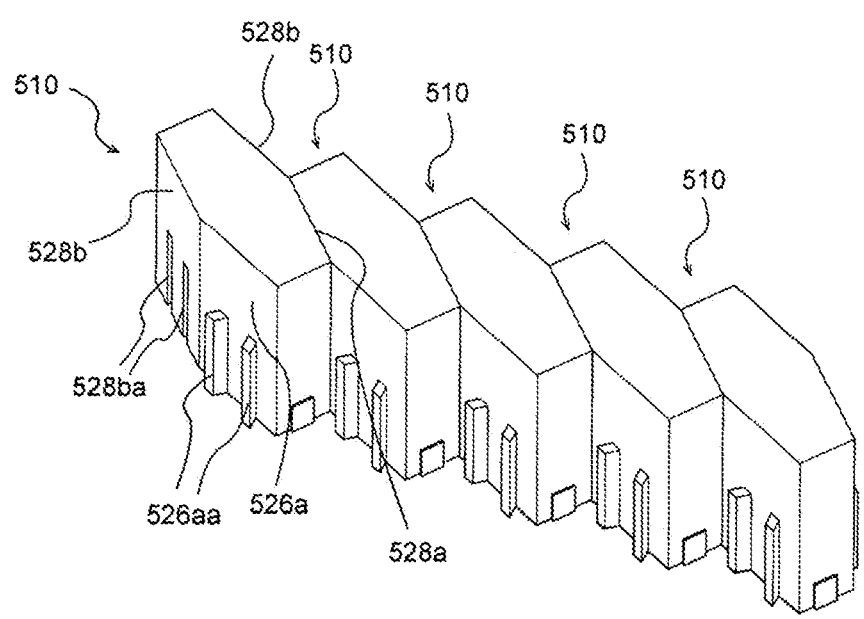
FIG. 12 is a conceptual diagram illustrating an example of the usage state of the electronic device shown in FIG. 10.

FIG. 10 is a schematic oblique view of an electronic device 510 according to Fifth Embodiment of the present invention, and FIG. 11 is a bottom view of the electronic device 510. FIG. 12 is a conceptual diagram illustrating a connected state of a plurality of electronic devices 510.

As shown in FIG. 10 and FIG. 11, the electronic device 510 is different from the electronic device 210 shown in FIG. 6 and FIG. 7 in terms of protrusion units 526aa and 528aa formed on a fifth outer side surface 526a and a fourth outer side surface 528a of a case 520 and groove units 526ba and 528ba formed on a third outer side surface 526b and a sixth outer side surface 528b of the case 520. Except that the case 520 includes the protrusion units 526aa and 528aa and the groove units 526ba and 528ba, however, the electronic device 510 is similar to the electronic device 210 shown in FIG. 6 and FIG. 7. In the description of the electronic device 510, only the differences from the electronic device 210 according to Second Embodiment are described, and common respects with the electronic device 210 are not described.

As shown in FIG. 10 and FIG. 11, similarly to the case 220 shown in FIG. 6, the case 520 has a substantially hexagonal columnar outer shape. Among the outer side surfaces, however, the groove units 526ba and 528ba or the protrusion units 526aa and 528aa are formed on the third to sixth outer side surfaces 526b, 528a, 526a, and 528b other than the first outer side surface 524 and the second outer side surface 525 for arranging the first and second folded portions 47 and 57 of the first and second metal terminals 40 and 50.

As shown in FIG. 11, the groove unit 526ba extending in the height direction is formed on the third outer side surface 526b of the case 520. The groove unit 526ba is formed at an interval and is made of two grooves parallel to each other. The two grooves constituting the groove unit 526ba continue to the opening edge 522.

As shown in FIG. 10 and FIG. 11, the protrusion unit 528aa extending in the height direction is formed on the fourth outer side surface 528a of the case 520. The protrusion unit 528a corresponds to the shape of the groove unit 526ba formed on the third outer side surface 526b and is made of two protrusions parallel to each other. The two protrusions constituting the protrusion unit 528aa continue to the opening edge 522.

FIG. 12 is a conceptual diagram illustrating a connection state of a plurality of electronic devices 510. As shown in FIG. 12, the protrusion unit 528aa formed on the fourth outer side surface 528a can be engaged with the groove unit 526ba formed on the third outer side surface 526b parallel to the fourth outer side surface 528a in another electronic device 510 having the same shape. As shown in FIG. 12, the plurality of electronic devices 510 can be connected to each other by engaging the protrusion unit 528aa with the groove unit 526ba.

The protrusion unit 526aa similar to the protrusion unit 528aa of the fourth outer side surface 528a is formed on the fifth outer side surface 526a of the case 520. The groove unit 528ba similar to the groove unit 526ba of the third outer side surface 526b is formed on the sixth outer side surface 528b of the case 520. The protrusion unit 526aa can be engaged with the groove unit 528ba formed on the sixth outer side surface 528b parallel to the fifth outer side surface 526a in another electronic device 510 having the same shape. Thus, the plurality of electronic devices 510 can also be connected by engaging the protrusion unit 526aa with the groove unit 528ba.

In the electronic device 510 shown in FIG. 10 to FIG. 12, a plurality of connected electronic devices 510 (see FIG. 12) can be transported at once, for example, when transported to a mounting board using a mounting machine by connecting the plurality of electronic devices 510 to each other, and the mounting efficiency can thus be improved.

As for common respects with the electronic device 210 according to Second Embodiment, the electronic device 510 according to Fifth Embodiment exhibits effects similar to those of the electronic device 210.

Hereinabove, electronic devices according to the present invention are described with embodiments, but the present invention is not limited to only the above-mentioned embodiments, and needless to say, includes many other embodiments and modifications. For example, a plurality of ceramic elements may be accommodated in the recess of the case by overlapping with each other, and three or more ceramic elements may be arranged side by side in the length direction of the case.

The protrusion unit and groove unit similar to the protrusion unit 528aa and the groove unit 526ba included in the electronic device 510 may be formed on the outer side surfaces of the electronic device 10 having a substantially square columnar shape.

DESCRIPTION OF THE REFERENCE NUMERICAL 10, 210, 310, 410, 510 . . . electronic device
20, 220, 320, 520 . . . case
21, 321 . . . recess
21a, 321a . . . opening
22, 222, 322, 522 . . . opening edge
24, 224, 324, 524 . . . first outer side surface
25, 225, 325, 525 . . . second outer side surface
226a, 326a, 526a . . . fifth outer side surface
226b, 326b, 526b . . . third outer side surface
228a, 328a, 528a . . . fourth outer side surface
228b, 328b, 528b . . . sixth outer side surface
30, 330, 430 . . . ceramic element
330a, 430a . . . first element portion
370a, 470a . . . second element portion
31a, 331a, 371a, 431a, 471a . . . first main surface
33 . . . first electrode portion
31b, 331b, 371b, 431b, 471b . . . second main surface
34 . . . second electrode portion
35 . . . dielectric portion
W1 . . . diameter
W2 . . . depth
40, 440 . . . first metal terminal
42 . . . first mounting portion
42a, 52a . . . tip
44, 244, 444 . . . first electrode connection portion
47 . . . first folded portion
46 . . . first terminal arm portion
50, 350, 450 . . . second metal terminal
52, 352 . . . second mounting portion
54, 354, 454 . . . second electrode connection portion 56, 356 . . . second terminal arm portion
57, 357 . . . second folded portion
380 . . . third metal terminal
382 . . . third mounting portion
384 . . . third electrode connection portion
386 . . . third terminal arm portion
526aa, 528aa . . . protrusion unit
526ba, 528ba . . . groove unit

What is claimed is:

1. An electronic device comprising:
a case including a recess and an opening edge of the recess;
a ceramic element disposed in the recess and including:
   a first main surface and a second main surface opposing to each other, the first main surface and the second main surface being a pair of surfaces having the largest area in the ceramic element;
   a first electrode portion formed on the first main surface; and
   a second electrode portion formed on the second main surface;
a first metal terminal including:
   a first mounting portion disposed on the opening edge and being substantially perpendicular to the first main surface and the second main surface; and
   a first electrode connection portion connected to the first electrode portion; and
a second metal terminal including:
   a second mounting portion disposed on the opening edge and being substantially perpendicular to the first main surface and the second main surface; and
   a second electrode connection portion connected to the second electrode portion.

2. The electronic device according to claim 1, wherein
the case includes a first outer side surface and a second outer side surface substantially perpendicular to the first and second main surfaces and the first and second mounting portions and facing in opposite directions,
a distance from a tip of the first mounting portion to the first outer side surface is smaller than that from the tip of the first mounting portion to the recess, and
a distance from a tip of the second mounting portion to the second outer side surface is smaller than that from the tip of the second mounting portion to the recess.

3. The electronic device according to claim 1, wherein
the ceramic element includes a first element portion and a second element portion each having the first main surface, the second main surface, the first electrode portion, and the second electrode portion,
the first element portion and the second element portion are arranged side by side in the recess along a length direction of the case in a posture where the first main surface of the first element portion and the first main surface of the second element portion face in opposite directions,
the first electrode connection portion is connected to the first electrode portion of the first element portion,
the second electrode connection portion is connected to the second electrode portion of the second element portion, and
the electronic device comprises a third metal terminal connecting between the second electrode portion of the first element portion and the first electrode portion of the second element portion.

4. The electronic device according to claim 3, wherein the first element portion and the second element portion are arranged in the recess so that:
   the first main surface of the first element portion and the second main surface of the second element portion are located on substantially the same plane; and
   the second main surface of the first element portion and the first main surface of the second element portion are located on substantially the same plane.

5. The electronic device according to claim 1, wherein
the ceramic element includes a first element portion and a second element portion each having the first main surface, the second main surface, the first electrode portion, and the second electrode portion,
the first element portion and the second element portion are arranged side by side in the recess along a length direction of the case in a posture where the first main surface of the first element portion and the first main surface of the second element portion face in the same direction,
the first electrode connection portion is connected to both of the first electrode portions of the first element portion and the second element portion, and
the second electrode connection portion is connected to both of the second electrode portions of the first element portion and the second element portion.

6. The electronic device according to claim 5, wherein the first element portion and the second element portion are arranged in the recess so that:
   the first main surface of the first element portion and the first main surface of the second element portion are located on substantially the same plane; and
   the second main surface of the first element portion and the second main surface of the second element portion are located on substantially the same plane.

7. The electronic device according to claim 1, wherein at least a part of the opening edge of the case is visible from below.

8. The electronic device according to claim 1, wherein the case has a substantially hexagonal columnar shape whose outer side surfaces are all non-parallel to the first main surface and the second main surface.

9. The electronic device according to claim 1, comprising
a groove unit formed on a third outer side surface of the case; and
a protrusion unit formed on a fourth outer side surface of the case and corresponding to a shape of the groove unit.

10. The electronic device according to claim 1, wherein
the first metal terminal includes a first folded portion extending upward along outer side surfaces of the case from a tip of the first mounting portion, and
the second metal terminal includes a second folded portion extending upward along outer side surfaces of the case from a tip of the second mounting portion.

11. The electronic device according to claim 1, wherein the ceramic element is one single plate ceramic element.

12. The electronic device according to claim 1, wherein the ceramic element has a substantially disk-shaped outer shape.

13. An electronic device comprising:
a case including a recess, an opening edge of the recess, and an upper bottom, the opening edge configuring a bottom surface of the electronic device facing to a mounting target, the upper bottom being formed an upper part of the electronic device opposite side of the opening edge;
a ceramic element disposed in the recess and including:
   a first main surface and a second main surface opposing to each other;

a first electrode portion formed on the first main surface; and a second electrode portion formed on the second main surface;

a first metal terminal including:

a first mounting portion disposed on the opening edge and being substantially perpendicular to the first main surface and the second main surface; and a first electrode connection portion connected to the first electrode portion;

a second metal terminal including:

a second mounting portion disposed on the opening edge and being substantially perpendicular to the first main surface and the second main surface; and a second electrode connection portion connected to the second electrode portion, wherein no conductive member is present on an outer surface of the upper bottom of the case.

14. The electronic device according to claim 13, wherein the case includes a first outer side surface and a second outer side surface substantially perpendicular to the first and second main surfaces and the first and second mounting portions and facing in opposite directions, a distance from a tip of the first mounting portion to the first outer side surface is smaller than that from the tip of the first mounting portion to the recess, and a distance from a tip of the second mounting portion to the second outer side surface is smaller than that from the tip of the second mounting portion to the recess.

15. The electronic device according to claim 13, wherein the ceramic element includes a first element portion and a second element portion each having the first main surface, the second main surface, the first electrode portion, and the second electrode portion, the first element portion and the second element portion are arranged side by side in the recess along a length direction of the case in a posture where the first main surface of the first element portion and the first main surface of the second element portion face in opposite directions, the first electrode connection portion is connected to the first electrode portion of the first element portion, the second electrode connection portion is connected to the second electrode portion of the second element portion, and the electronic device comprises a third metal terminal connecting between the second electrode portion of the first element portion and the first electrode portion of the second element portion.

16. The electronic device according to claim 13, wherein the ceramic element includes a first element portion and a second element portion each having the first main surface, the second main surface, the first electrode portion, and the second electrode portion, the first element portion and the second element portion are arranged side by side in the recess along a length direction of the case in a posture where the first main surface of the first element portion and the first main surface of the second element portion face in the same direction, the first electrode connection portion is connected to both of the first electrode portions of the first element portion and the second element portion, and the second electrode connection portion is connected to both of the second electrode portions of the first element portion and the second element portion.

17. The electronic device according to claim 13, wherein at least a part of the opening edge of the case is visible from below.

18. The electronic device according to claim 13, wherein the case has a substantially hexagonal columnar shape whose outer side surfaces are all non-parallel to the first main surface and the second main surface.

19. The electronic device according to claim 13, comprising a groove unit formed on a third outer side surface of the case; and a protrusion unit formed on a fourth outer side surface of the case and corresponding to a shape of the groove unit.

20. The electronic device according to claim 13, wherein the first metal terminal includes a first folded portion extending upward along outer side surfaces of the case from a tip of the first mounting portion, and the second metal terminal includes a second folded portion extending upward along outer side surfaces of the case from a tip of the second mounting portion.

21. An electronic device comprising:

a case including a recess and an opening edge of the recess;

a ceramic element disposed in the recess and including:

a first main surface and a second main surface opposing to each other;

a first electrode portion formed on the first main surface; and a second electrode portion formed on the second main surface;

a first metal terminal including:

a first mounting portion disposed on the opening edge and being substantially perpendicular to the first main surface and the second main surface; and a first electrode connection portion connected to the first electrode portion;

a second metal terminal including:

a second mounting portion disposed on the opening edge and being substantially perpendicular to the first main surface and the second main surface; and a second electrode connection portion connected to the second electrode-portion, the ceramic element includes a first element portion and a second element portion each having the first main surface, the second main surface, the first electrode portion, and the second electrode portion, the first element portion and the second element portion are arranged side by side in the recess along a length direction of the case in a posture where the first main surface of the first element portion and the first main surface of the second element portion face in opposite directions, the first electrode connection portion is connected to the first electrode portion of the first element portion, the second electrode connection portion is connected to the second electrode portion of the second element portion, and the electronic device comprises a third metal terminal connecting between the second electrode portion of the first element portion and the first electrode portion of the second element portion.

22. The electronic device according to claim 21, wherein the first element portion and the second element portion are arranged in the recess so that:

the first main surface of the first element portion and the second main surface of the second element portion are located on substantially the same plane; and the second main surface of the first element portion and the first main surface of the second element portion are located on substantially the same plane.

23. The electronic device according to claim 21, wherein the third metal terminal includes:

a third electrode connection portion connecting between the second electrode portion of the first element portion and the first electrode portion of the second element portion; and a third mounting portion disposed on the opening edge and being substantially perpendicular to the first main surface and the second main surface.

* * * * *